(12) United States Patent
Kushnir

(10) Patent No.: US 9,269,055 B2
(45) Date of Patent: Feb. 23, 2016

(54) DATA CLASSIFIER USING PROXIMITY GRAPHS, EDGE WEIGHTS, AND PROPAGATION LABELS

(71) Applicant: ALCATEL-LUCENT USA INC., Murray Hill, NJ (US)

(72) Inventor: Dan Kushnir, Springfield, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 325 days.

(21) Appl. No.: 13/868,512

(22) Filed: Apr. 23, 2013

(65) Prior Publication Data

US 2014/0317034 A1    Oct. 23, 2014

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
CPC ...................... G06N 99/005; G06F 17/30705
USPC .............................................. 706/12, 20, 45
See application file for complete search history.

(56) References Cited

U.S. PATENT DOCUMENTS

| | | | |
|---|---|---|---|
| 2010/0217732 A1* | 8/2010 | Yang et al. | 706/21 |
| 2012/0095943 A1 | 4/2012 | Yankov et al. | |
| 2014/0272822 A1* | 9/2014 | Yang et al. | 434/167 |
| 2014/0278390 A1* | 9/2014 | Kingsbury et al. | 704/232 |

OTHER PUBLICATIONS

International Search Report and Written Opinion for PCT Application No. PCT/US2014/033962, mailed Nov. 28, 2014.
Masud, Mohammad M., et al., "Facing the reality of data stream classification: coping with scarcity of labeled data," pp. 213-244. Published online: Nov. 20, 2011, Springer-Verlag London Limited 2011.
Al-Khateeb, Tahseen, et al., (2012). "Stream Classification with Recurring and Novel Class Detection using Class-Based Ensemble." IEEE 12th International Conference on Data Mining (2012).

* cited by examiner

*Primary Examiner* — David Vincent
(74) *Attorney, Agent, or Firm* — Carlson, Gaskey & Olds, P.C.

(57) ABSTRACT

An illustrative data classifier device includes data storage and at least one processor configured to operate as a query engine and a passive classifier that is configured to predict classification labels for data. The processor is configured to determine a relationship between the data and training data with associated training classification labels. The processor is also configured to assign a weighted version of at least one of the training classification labels to at least one member of the data based on the determined relationship. An illustrative method of classifying data includes predicting classification labels for data by determining a relationship between the data and training data with associated training classification labels. A weighted version of at least one of the training classification labels is assigned to at least one member of the data based on the determined relationship.

14 Claims, 2 Drawing Sheets

DATA CLASSIFIER USING PROXIMITY GRAPHS, EDGE WEIGHTS, AND PROPAGATION LABELS

TECHNICAL FIELD

This disclosure generally relates to data classification. More particularly, and without limitation, this disclosure relates to predicting classification labels for a data set based on a smaller training data set.

DESCRIPTION OF THE RELATED ART

There are a variety of situations in which it would be useful to be able to efficiently predict class assignment for test data based on limited training data resources. Typical approaches include using a training data set of measurements that has class labels assigned to the training set measurements. An additional set of class labels are generated for additional measurements with the goal of minimizing prediction error for test data.

In some cases the input data is given in the form of measurements $X_1, \ldots, X_N$, where each $X_i$ is a vector of d measurements. A small subset of the input data is size L (L<M≤N) and may have attached class assignment labels: $Y_1, \ldots, Y_L$, such that $Y_i$'s are binary integers (e.g., {−1,1}). This set is referred to as the 'training set'. The task is then to augment the pairs $(X_1,Y_1), \ldots, (X_L,Y_L)$ with an additional minimal set of pairs by actively selecting and labeling them from $X_{L+1}, \ldots, X_M$, such that the prediction error (or risk) of a classifier output $-Y'_{M+1}, \ldots, Y'_N$ using the new labeled training set is minimized for a given test set $X_{M+1}, \ldots, X_N$.

The existing solutions belong to a class of learning algorithms defined in the literature as 'active' classifiers, as they actively construct a training set from which they can learn and predict the class labels of a given test set. Given limited labeling resources, the active classifier algorithm is configured to obtain an optimal label assignment for the test set while querying the true labels of as few as possible training set members.

One shortcoming of existing solutions is that they are not efficient at handling large data sets. The time and computational resources required to obtain results in some circumstances detracts from the potential value of the results. For example, an existing solution may take over a month of running time using 20 CPUs for relatively small size data sets. Another feature of existing solutions is that they use different criteria in classification and query selection, which can yield classification accuracy that is less than desired.

SUMMARY

An illustrative data classifier device includes data storage and at least one processor configured to predict classification labels for data. The processor is configured to determine a relationship between the data and training data with associated training classification labels. The processor is also configured to assign a weighted version of at least one of the training classification labels to at least one member of the data based on the determined relationship.

An illustrative method of classifying data includes using at least one processor for predicting classification labels for data by determining a relationship between the data and training data with associated training classification labels. A weighted version of at least one of the training classification labels is assigned to at least one member of the data based on the determined relationship.

Various embodiments and their features will become apparent to those skilled in the art from the following detailed description of at least one example embodiment. The drawings that accompany the detailed description can be briefly described as follows.

DETAILED DESCRIPTION

Figure 1:
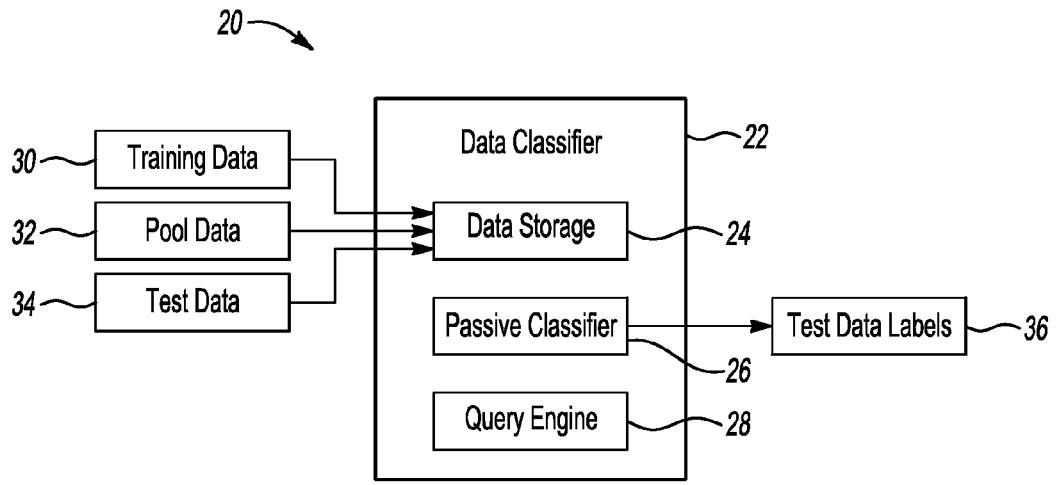
FIG. 1 schematically illustrates an example data classifier designed according to an embodiment of this invention.

FIG. 1 schematically illustrates a data classification system 20. A data classifier device 22 includes data storage 24, a passive classifier 26 and a query engine 28. The data storage 24 may comprise one or more types of computer memory configured to at least temporarily store data such as training data 30, pool data 32 and test data 34. In this example, the training data 30 may comprise a relatively limited set of data entries (e.g., measurements) and associated classification labels, the pool data 32 may comprise data entries that are candidates to be added to the training data, and the test data 34 represents data entries (e.g., measurements) for which it is desirable to determine a classification label based on the training data 30.

Some implementations will include pool data 32 while others will not. In situations that include pool data, the pool data 32 is that which can be used by the query engine 28 to identify an addition to the training data 30 (in a manner described below). In situations that do not include pool data 32, the query engine 28 considers the test data 34 to identify an addition to the training data 30. For discussion purposes, the following description will refer primarily to the test data 34 and that should be understood in a generic sense to include the pool data 32 if pool data were included unless the context clearly indicates otherwise.

The data classifier device 22 comprises one or more processors, such as computing devices executing instructions provided through programming for example, configured to operate as the passive classifier 26 and the query engine 28. The passive classifier 26 predicts classification labels Y' for the test data 34, in part based on labels Y associated with the training data 30. The size of the training data set 30 will usually be much smaller than the size of the test data set 34. The query engine 28 uses the training data 30, test data 34 (and pool data 32 if included), the labels Y of the training data, and the predicted labels Y' from the passive classifier 26 to identify a data entry from the test data (or pool data if included) to query for its true label Y. As described in more detail below, the query engine 28 bases the determination of which data entry to include in an augmented training data set on the predicted label values Y' of the test data (or pool data if included) and the influence of each of the data set entries on other entries. The query engine 28 identifies the additional data entry (and its corresponding label) to be added to the training data 30 so that it may be used by the passive classifier 26 for further predictions of classification labels.

The eventual output from the data classifier device 22 is a data set schematically shown at 36 that provides a set of classification labels for at least some of the entries in the test data set 34. The type of data and classification labels may vary depending on the needs of a particular implementation.

One example scenario in which such classification could be useful is in the context of telecommunication big data analytics, such as predicting subscriber churn from a telecommunication network. Network operators are interested in the ability to predict which subscribers will churn in an effort to detect and retain potential churners before they unsubscribe from the network operator. In some cases the classifier device 22 may be employed using input training data 30 in the form of measurements for each subscriber, possibly with a labeling function indicating which subscriber has churned. The classifier device 22 acquires labels for more data points and builds a prediction (or a hypothesis) indicating if another set of subscribers (represented by the test data set 34) will churn. The labels indicating the built prediction are part of the output schematically shown at 36.

Another possible use of the classifier device 22 is to predict a likelihood that a customer Set-Top Box (STB) or Customer Premises Equipment (CPE) will fail. In many situations there will be limited data available regarding actual failure as confirmation might require lab examination of the device. The test data set 30 may include parameter measurements obtained from the STBs or CPEs and a binary labeling function of 'failed' or 'OK'. The classifier device 22 is useful for learning a labeling of a very large set of STBs or CPEs by using only limited labeling resources to create a prediction model that minimizes the test set error. The resulting prediction model can be used to predict the likelihood of a customer device failure in the near future. This may allow the operator to take proactive actions to address any devices having a high likelihood to fail without having to wait for an actual failure or a customer call.

Other possible uses for the device 22 will become apparent to those skilled in the art who have the benefit of this description.

Figure 2:
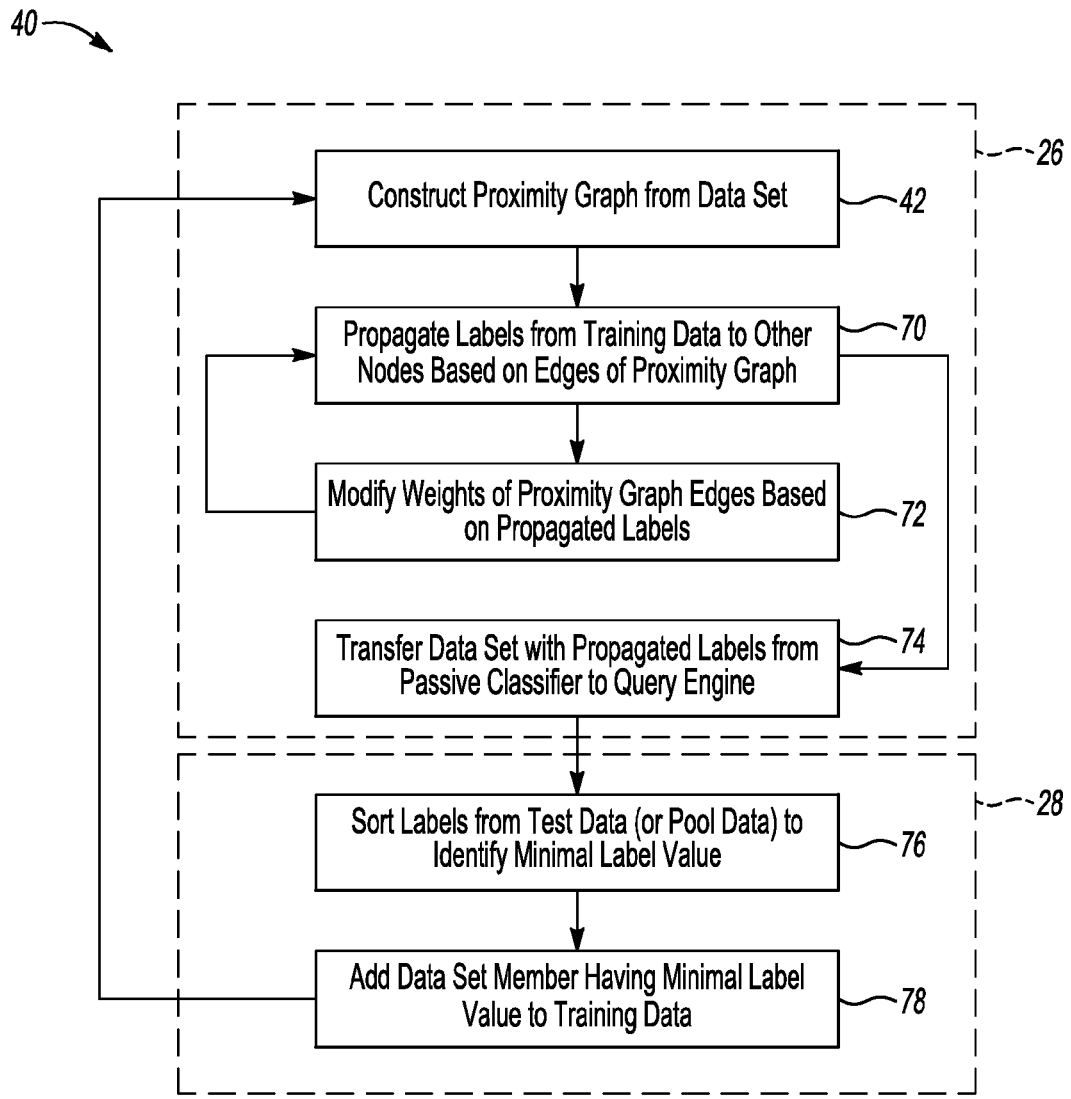
FIG. 2 is a flowchart diagram summarizing an approach for classifying data.

The manner in which the example device 22 builds a prediction for data classification is summarized in the flowchart diagram 40 of FIG. 2. Portions of the process shown in FIG. 2 performed by the passive classifier 26 are represented within the area designated by broken lines and labeled 26 while portions performed by the query engine 28 are within the area designated by broken lines and labeled 28.

The passive classifier receives data from the data storage 24 including at least training data 30 and test data 34. Some examples will also include pool data 32. At 42, the passive classifier 26 constructs a proximity graph from the data. The proximity graph includes a node for each data set entry (e.g., each measurement) and edges between nodes.

Figure 3:
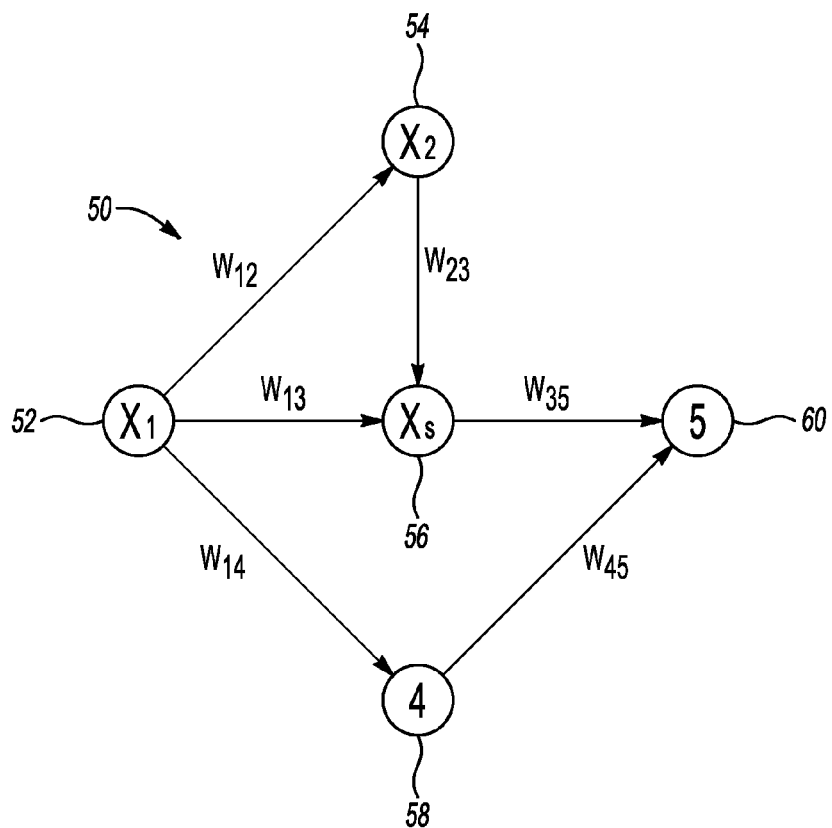
FIG. 3 schematically illustrates a proximity graph useful as part of the technique summarized in FIG. 2.

FIG. 3 schematically shows an example proximity graph 50. The nodes shown at 52, 54, 56, 58, and 60 represent different members of the data set including training data and test data. An edge between nodes is shown if one of the two nodes is one of the K-closest nodes to the other. In other words, the proximity graph 50 includes an edge between nodes $X_i$ and $X_j$ if $X_j$ is one of the K-closest nodes to $X_i$, or if $X_i$ is one of the K-closest nodes to $X_j$. In this example, K is a preselected threshold. Edges between the nodes are assigned weights that correspond to an amount of similarity between the nodes. Each edge between a pair of nodes (i,j) is weighted by a similarity metric $w_{ij}$ between their values (e.g., measurements) and edges between similar nodes. Initial edge weights ωij are computed as $\exp(-(|X_i-X_j|^1)/\sigma_1)$, where $\sigma_1$ is a user defined parameter which may or may not depend on $X_i$ and $X_j$. ωij is normalized to $$w_{ij} = \frac{\omega ij}{\sum_j \omega ij}$$

to form the final edge weights.

In this example, there is no edge shown between the nodes at 54 and 60 because neither is one of the K-closest nodes to the other. Diluting edges in this manner may reduce the processing time without penalty because there is not enough similarity between the nodes 54 and 60 to consider the edge between them for the propagation of test data set labels.

Returning attention to FIG. 2, the passive classifier 26 propagates labels from the training data set nodes of the graph 50 to other nodes in the graph at 70. Propagating the training data set node labels is done based on the weights of the edges of the proximity graph 50. Nodes having more similar values (e.g., measurements) have a higher weighting. Propagating the training data set labels to the other nodes in this example includes propagating a larger portion of the label along the edges having the higher weights and a lesser portion along the edges having lower weights.

In this example, the passive classifier 26 creates a characteristic vector v such that $v_i=Y_i$ if i is a training sample index, otherwise $v_i=0$. The passive classifier applies the weights matrix W, whose entry (i,j) is formulated as described above, to the vector v. The resulting vector ṽ from the product ṽ=Wv can be used again in the same product after reinitializing ṽ on the training indices to the Y values. This process of applying products of W to the characteristic vector is repeated $t_1$ times in this example, where $t_1$ is a user-defined parameter. The passive classifier 26 then modifies the weights of the proximity graph edges based on the propagated labels at 72. The classification algorithm uses the current propagated values to redefine the weights in the graph in the following way $$\omega_{ij} = \exp(-(|X_i - X_j|^\wedge 2)/\sigma_1) \cdot \exp\left(-\frac{|v_i - v_j|}{\sigma_2}\right),$$

where $\sigma_1$ and $\rho_2$ are user-defined parameters that may or may not depend on $X_i$ and $X_j$. The modified weights may then be used for additional label propagation in the step at 70. As schematically represented in FIG. 2, the label propagation at 70 and the weight modification at 72 repeats a pre-selected number of times $-t_2$.

At 74 the passive classifier 26 transfers the data set with the propagated labels to the query engine 28. The newly generated labels for the test data set 34 and the pool data set 32, if one is included) are given as a subset of the entries in the vector ṽ and are transferred to the query engine 28 as $Y'_{L+1}, \ldots Y'_N$.

At 76 the query engine sorts the labels from the test data 34 (or the pool data 32, if included) to identify the label value that has a preselected characteristic. In this example, the query engine 28 identifies the minimum label value. The query engine 28 in this example sorts the Y's (i.e., the labels received from the passive classifier 26) corresponding to the pool data set 32 (if one is included) or the test data set 30. If some Y's have 0-values the query engine 28 chooses from them the corresponding data point that has the maximal sum of weights to all its neighbors: $d_i=\Sigma_j w_{ij}$. Otherwise the query engine 28 chooses the data point that has the minimal Y' value.

At 78 the query engine 28 adds the data entry that corresponds to the label identified at 76 and the corresponding true label to the training data set 30, which can be denoted as $(X_{L+1}, Y_{L+1})$. In one example, the query engine 28 obtains the true label from a teacher (not illustrated) that provides the true label using a known technique. The query engine 28 provides the addition to the training data set or the augmented training data set to the passive classifier 26 so that the process summarized at 42 and 70-74 may be repeated by the passive classifier 26 using the updated training data. This augmentation of the training data set may be repeated a preselected number of times.

The eventual result is the set of test data 34 and the associated labels Y' at 36 (FIG. 1).

One way in which the example classifier device 22 differs from previous active classifiers is that it includes the process of propagating test data labels in a proximity graph to nodes that correspond to the test data (and pool data if included). Having that propagation based on the similarity between nodes connected by an edge of the proximity graph and on their labels (whether true or predicted) enhances the passive classifier accuracy and speeds the convergence of the label propagation process.

EXAMPLE

Another way in which the example classifier device 22 differs from previous classifiers is that the query engine identifies the data entry to add to the training data set based on the predicted label values of the pool data or test data and the influence that each node has on its neighbors in the proximity graph instead of using an additional computation based on a predetermined criteria.

The combination of features described above may provide the ability to significantly reduce the time it takes to predict labels for a large data set and it may reduce the amount of computing resources required to process the information. Instead of waiting weeks or months for results, which may be the case with previous classification techniques, the example device and method described above can provide results in minutes. Additionally, such results may be obtained on much larger data sets and the results are more accurate than those possible with some previous classification techniques.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

I claim:

1. A data classifier device, comprising:
   a data storage; and
   at least one processor configured to predict classification labels for test data by:
      determining a relationship between the test data and training data, the training data having associated training classification labels, the determining comprising generating a proximity graph in which test data and training data members are represented by nodes of the proximity graph;
      assigning initial edge weights to the edges between the nodes in the proximity graph that correspond to a similarity between the nodes;
      performing a first propagation of labels from training data nodes in the proximity graph to test data nodes in the proximity graph based on the initial edge weights;
      modifying the initial edge weights based on the first propagation of labels;
      performing a second propagation of labels from training data nodes in the proximity graph to test data nodes in the proximity graph based on the modified edge weights; and
      adding, after the second propagation of labels, a member of the test data that is part of the proximity graph and its associated label to the training data based on the associated label.

2. The device of claim 1, wherein the processor:
   sorts a plurality of the labels of the test data nodes from the second propagation to identify one of the labels that satisfies a preselected criterion; and
   selects the test data member having the identified label as the data member to add to the training data.

3. The device of claim 2, wherein the preselected criterion corresponds to a label having a minimum magnitude of the labels from the second propagation.

4. The device of claim 1, wherein the processor is configured to, if some of the test data nodes have a 0-value label:
   determine a sum of weights between the nodes having the 0-value labels and corresponding graph neighbors, respectively,
   determine which of the determined sums is larger than the other determined sums, and
   select the test data member corresponding to the node having the sum that is larger than the other determined sums as the data member to add to the training data.

5. A method of classifying data, comprising:
   using at least one processor for predicting classification labels for test data by:
      determining a relationship between the test data and training data that has associated training classification labels, the determining comprising generating a proximity graph in which test data and training data members are represented by nodes of the proximity graph;
      assigning initial edge weights to the edges between the nodes in the proximity graph that correspond to a similarity between the nodes;
      performing a first propagation of labels from training data nodes in the proximity graph test data nodes in the proximity graph based on the initial edge weights;
      modifying the initial edge weights based on the first propagation of labels;
      performing a second propagation of labels from training data nodes in the proximity graph to test data nodes in the proximity graph based on the modified edge weights; and
      adding, after the second propagation of labels, a member of the test data that is part of the proximity graph and its associated label, to the training data based on the associated label.

6. The method of claim 5, comprising
   sorting a plurality of the labels of the test data nodes from the second propagation to identify one of the labels that satisfies a preselected criterion; and
   selecting the test data member having the identified label as the data member to add to the training data.

7. The method of claim 6, wherein the preselected criterion corresponds to a label having a minimum magnitude of the labels from the second propagation.

8. The method of claim 7, comprising, if some of the test data nodes have 0-value predicted labels;
   determining a sum of weights between the nodes having the 0-value labels and corresponding graph neighbors, respectively,
   determining which of the determined sums is larger than the other determined sums, and selecting the test data member having the sum that is larger than the other determined sums as the data member to add to the training data.

9. The device of claim 1, wherein if any of the training data nodes have a 0-value label, said adding a member of the test data that is part of the proximity graph and its associated label to the training data is further based on and the modified weights.

10. The device of claim 1, wherein the processor assigns the initial edge weights between two nodes based on the following equation:

$$w_{ij} = e^{\frac{-|x_i - x_j|^2}{\sigma_1}}$$

where:
  $w_{ij}$ is an edge weight;
  Xi and Xj are data points corresponding to two nodes in the proximity graph that a given edge is between; and
  $\sigma_1$ is a user defined parameter.

11. The device of claim 10, the processor modifies the initial edge weights based on the following equation:

$$w_{ij} = e^{\frac{-|x_i - x_j|^2}{\sigma_1}} \times e^{\frac{-|v_i - v_j|}{\sigma_2}}$$

where:
  $v_i$ and $v_j$ are labels for Xi and Xj, respectively, resulting from the first propagation of labels; and
  $\sigma_2$ is a user defined parameter.

12. The method of claim 5, wherein if any of the training data nodes have a 0-value label, said adding a member of the test data that is part of the proximity graph and its associated label to the training data is further based on and the modified weights.

13. The method of claim 5, wherein said assigning initial edge weights is performed based on the following equation:

$$w_{ij} = e^{\frac{-|x_i - x_j|^2}{\sigma_1}}$$

where:
  $w_{ij}$ is an edge weight;
  Xi and Xj are data points corresponding to two nodes in the proximity graph that a given edge is between; and
  $\sigma_1$ is a user defined parameter.

14. The method of claim 13, wherein said modifying the initial edge weights based on the propagated labels is performed using the following equation:

$$w_{ij} = e^{\frac{-|x_i - x_j|^2}{\sigma_1}} \times e^{\frac{-|v_i - v_j|}{\sigma_2}}$$

where:
  $v_i$ and $v_j$ are labels for Xi and Xj, respectively, resulting from the first propagation of labels; and
  $\sigma_2$ is a user defined parameter.

* * * * *